(12) United States Patent
Barnes (10) Patent No.: US 11,397,541 B2
(45) Date of Patent: Jul. 26, 2022

(54) CONTROLLING GUARD TAG CHECKING IN MEMORY ACCESSES

(71) Applicant: Arm Limited, Cambridge (GB)

(72) Inventor: Graeme Peter Barnes, Cambridge (GB)

(73) Assignee: Arm Limited, Cambridge (GB)

( * ) Notice: Subject to any disclaimer, the term of this patent is extended or adjusted under 35 U.S.C. 154(b) by 10 days.

(21) Appl. No.: 16/647,742

(22) PCT Filed: Jan. 23, 2019

(86) PCT No.: PCT/GB2019/050191
§ 371 (c)(1),
(2) Date: Mar. 16, 2020

(87) PCT Pub. No.: WO2019/150078
PCT Pub. Date: Aug. 8, 2019

(65) Prior Publication Data
US 2020/0225872 A1 Jul. 16, 2020

(30) Foreign Application Priority Data
Feb. 2, 2018 (GB) ...................... 1801750

(51) Int. Cl.
*G06F 3/06* (2006.01)

(52) U.S. Cl.
CPC .......... *G06F 3/0659* (2013.01); *G06F 3/0604* (2013.01); *G06F 3/0673* (2013.01)

(58) Field of Classification Search
CPC .... G06F 3/0659; G06F 3/0604; G06F 3/0673; G06F 12/1024; G06F 12/1052;
(Continued)

(56) References Cited

U.S. PATENT DOCUMENTS 6,101,586 A * 8/2000 Ishimoto ............. G06F 12/1441
711/163
2012/0296877 A1 11/2012 Guthrie et al.
(Continued)

FOREIGN PATENT DOCUMENTS

| GB | 2549511 | 10/2017 |
| TW | 200834415 | 8/2008 |
| TW | 201716995 | 5/2017 |

OTHER PUBLICATIONS

Richard H. Gumpertz, "Error Detection with Memory Tags", Carnegie Mellon University, Research Showcase @ CMU, Dissertations, Dec. 1981, 119 pages.
(Continued)

*Primary Examiner* — Tracy A Warren
(74) *Attorney, Agent, or Firm* — Nixon & Vanderhye P.C.

(57) ABSTRACT

An apparatus comprises memory access circuitry to perform a tag-guarded memory access in response to a target address, the tag-guarded memory access comprising a guard-tag check of comparing an address tag associated with the target address with a guard tag stored in association with a block of one or more memory locations comprising an addressed location identified by the target address. The memory access circuitry is responsive to a sequence of received target addresses specifying a sequence of addressed locations to perform a non-tag-guarded memory access that does not perform the guard-tag check to a subset of the sequence of addressed locations.

8 Claims, 8 Drawing Sheets

(58) Field of Classification Search
CPC ............. G06F 12/1466; G06F 12/1441; G06F 2212/1024; G06F 2212/1052
See application file for complete search history.

(56) References Cited

U.S. PATENT DOCUMENTS

| | | |
|---|---|---|
| 2013/0174224 A1 | 7/2013 | Ueki et al. |
| 2013/0326288 A1* | 12/2013 | Datta ..................... G06F 21/52 714/48 |
| 2016/0026791 A1* | 1/2016 | Melski ................... G06F 21/54 726/25 |
| 2016/0371139 A1* | 12/2016 | Stark ................... G06F 11/1666 |
| 2017/0177429 A1 | 6/2017 | Stark et al. |

OTHER PUBLICATIONS

Daniel Lo, et al., "Run-Time Monitoring with Adjustable Overhead Using Dataflow-Guided Filtering", IEEE, Cornell University, 2015, pp. 662-674.
Daniel Lo, et al., "Slack-Aware Opportunistic Monitoring for Real-Time Systems", IEEE, Cornell University, 2014, pp. 203-214.
Robert N.M. Watson, et al., "Capability Hardware Enhanced RISC Instructions: CHERI Instruction-Set Architecture", Version 6, Technical Report, University of Cambridge, No. 907, Apr. 2017, 9 pages.
Combined Search and Examination Report for GB Application No. 1801750.9 dated Jul. 24, 2018, 15 pages.
International Search Report and Written Opinion of the ISA for PCT/GB2019/050191 dated Apr. 25, 2019, 17 pages.
Office Action for TW Application No. 108104111 dated May 24, 2022 and English translation, 10 pages.

* cited by examiner

CONTROLLING GUARD TAG CHECKING IN MEMORY ACCESSES

This application is the U.S. national phase of International Application No. PCT/GB2019/050191 filed Jan. 23, 2019 which designated the U.S. and claims priority to GB Application No. 1801750.9 filed Feb. 2, 2018, the entire contents of each of which are hereby incorporated by reference.

The present technique relates to the field of data processing.

Software to be executed by a data processing apparatus may typically be written in a high-level programing language and then compiled into code according to the instruction set architecture supported by the apparatus on which the software is to be executed. For example, the software may originally be written in a higher level language such as Java, C or C++, and then compiled into a natively supported instruction set architecture such as x86 or Arm®.

Some higher level programing languages, such as Java, are considered memory-safe languages because they include run time error detection checks for checking for certain errors relating to memory accesses. In contrast, memory-unsafe languages, such as C and C++, do not include such run time error checks. The enduring prevalence of use of memory-unsafe languages means that in compiled code according to a given instruction set architecture, there may be a large number of memory related errors which may be vulnerable to exploitation by an attacker or other malicious party. Such errors may include:

Bounds violations, in which an array index supplied by the code is outside the legitimate bounds of the array;

Use-after-free errors, in which an access to a memory location is made after that memory location has already be deallocated or freed;

Use-after-return, in which a memory access to an address associated with a variable used within a function (such as a value on a stack) is made after already returning from the function;

Use-out-of-scope errors, in which variables are accessed outside of the scope in which they are declared; and Use-before-initialisation errors, in which a memory address associated with a variable is accessed before the variable has been initialised.

These are just some examples of memory-related errors which can result in unpredictable behaviour and potentially provide avenues for attackers to exploit and hence it may be desirable to provide architectural support, within the instruction set architecture supported by a given processing apparatus, for assisting with runtime detection of certain classes of memory errors.

At least some examples provide an apparatus comprising:
memory access circuitry to perform a tag-guarded memory access in response to a target address, the tag-guarded memory access comprising a guard-tag check of comparing an address tag associated with the target address with a guard tag stored in association with a block of one or more memory locations comprising an addressed location identified by the target address,
wherein the memory access circuitry is responsive to a sequence of received target addresses specifying a sequence of addressed locations to perform a non-tag-guarded memory access that does not perform the guard-tag check to a subset of the sequence of addressed locations.

At least some examples provide a method comprising:
performing a tag-guarded memory access in response to a target address, the tag-guarded memory access comprising a guard-tag check of comparing an address tag associated with the target address with a guard tag stored in association with a block of one or more memory locations comprising an addressed location identified by the target address; and
in response to a sequence of received target addresses specifying a sequence of addressed locations, performing a non-tag-guarded memory access that does not perform the guard-tag check to a subset of the sequence of addressed locations.

At least some examples provide a computer program for controlling a host data processing apparatus to provide an instruction execution environment for execution of instructions of target program code, comprising:
memory access program logic to perform a tag-guarded memory access in response to a target address, the tag-guarded memory access comprising a guard-tag check of comparing an address tag associated with the target address with a guard tag stored in association with a block of one or more memory locations comprising an addressed location identified by the target address,
wherein the memory access program logic, in response to a sequence of received target addresses specifying a sequence of addressed locations, performs a non-tag-guarded memory access that does not perform the guard-tag check to a subset of the sequence of addressed locations.

A storage medium may store the computer program described above. The storage medium may be a non-transitory storage medium.

The present techniques will be described further, by way of example only, with reference to embodiments thereof as illustrated in the accompanying drawings, in which.

At least some embodiments provide an apparatus comprising:
memory access circuitry to perform a tag-guarded memory access in response to a target address, the tag-guarded memory access comprising a guard-tag check of comparing an address tag associated with the target address with a guard tag stored in association with a block of one or more memory locations comprising an addressed location identified by the target address,
wherein the memory access circuitry is responsive to a sequence of received target addresses specifying a sequence of addressed locations to perform a non-tagguarded memory access that does not perform the guard-tag check to a subset of the sequence of addressed locations.

One approach for protecting against certain memory usage errors of the type discussed above may be to provide guard tags which are stored in a memory system in association with blocks of one or more memory locations. When a tag-guarded memory access is requested based on a target address identifying a particular addressed location in the memory system, memory access circuitry may compare an address tag that is associated with the target address with a guard tag that is stored in the memory system in associated with a block of one or more memory locations which includes the addressed location identified by the target address. The memory access circuitry may generate an indication of whether a match is detected between the guard tag and the address tag. This indication can be used to control whether the memory access is allowed to succeed or whether subsequent operations can succeed, or could merely be reported while allowing memory accesses to continue as normal.

This can be useful as, for example, a compiler compiling code based on a memory-unsafe language such as C or C++ can, when initialising regions of memory, set the guard tags of blocks of memory which the code is expected to access to particular values, and may associate the corresponding address tag values with the target addresses pointing to those blocks. If a memory usage error occurs, and for example the address pointer is used out of scope or extends out of the bounds of the valid range which was initialised, then it may be likely that the guard tag associated with the addressed location may not match the address tag associated with the target address, and then in this case the indication of whether a match is detected can be used to trigger some error handling response or error reporting mechanism. The particular response taken can depend on the particular needs of the software being executed or on the particular microarchitectural implementation of the architecture. Hence, even if the high level language does not have means for performing run time error checks in order to guard against memory access errors, the ISA used for the compiled code may include architectural features for performing such checks.

However, the checking of such guard tags may incur some overhead in performing the guard tag checking that may be less desirable in some contexts. The apparatus discussed here, when handling target addresses for memory accesses to addressed locations causes the guard tag checking to be carried out only for some memory accesses and not for others. Hence in response to a target address (or alternatively put, to a memory access request specifying a target address), the memory access circuitry selects some target addresses (memory access requests) for which the guard tag checking is not carried out and only the memory access itself is carried out, and selects other target addresses (memory access requests) for which the guard tag checking is carried out as well as the memory access itself. The above mentioned overhead burden of carrying out the guard tag checking can thus be managed, i.e. the burden can be scaled up or down depending on how the subset is defined. Moreover, the present technique recognises that benefit from guard-tag checking can still be gained, even when not all accesses are checked. For example, running over a sufficient period of time, this can still be sufficient to identify issues that need addressing with regard to accesses that violate defined guard-tag rules in some way. As a further example it may be the case that a large number of apparatuses are arranged as set out for the examples described herein and feedback from those large number of apparatuses can therefore provide a sufficiently large sample of data that makes up for the fact that any given individual device is only performing guard tag checking for a (perhaps rather small) subset of the memory accesses it carries out. Thus a kind of "crowd-sourced" feedback mechanism is used.

It should be appreciated that the definition of the subset as those memory accesses for which the guard tag checking is not carried out may trivially be inverted, i.e. the subset may be interpreted as those memory accesses for which the guard tag checking is carried out. This observation applies throughout the examples described herein.

The subset for which the guard tag checking is not performed may be defined and controlled in a variety of ways, but in some examples the apparatus comprises subset configuration data storage, wherein the subset is defined by subset configuration data stored in the subset configuration data storage. Setting this subset configuration data thus allows control over the definition of the subset.

The subset configuration data storage may be a configuration register.

The manner in which the subset configuration data is defined may take a variety of forms, but in some examples the subset configuration data defines a fraction, wherein the memory access circuitry is responsive to the subset configuration data to selectively perform the non-tag-guarded memory access such that the subset of the sequence of addressed locations corresponds to the fraction. This fraction may be variously defined, but can for example be interpreted as a percentage, wherein the defined percentage of memory accesses are therefore carried out without the guard tag checking.

In some examples the subset configuration data defines an integer value, wherein the memory access circuitry is responsive to the subset configuration data to perform the non-tag-guarded memory access for addressed locations which correspond to ordinal multiples of the integer value in the sequence of addressed locations. In other words the subset configuration data may be described as defining an integer n, and the memory access circuitry performs the non-tag-guarded memory access for every 1/n memory access.

In some examples the subset configuration data defines a target value, wherein the memory access circuitry is responsive to the subset configuration data to perform the non-tag-guarded memory access, such that such that the subset of the sequence of addressed locations statistically corresponds to the target value over a predetermined time period. Thus the memory access circuitry can be arranged to gather a statistical view of the number of tag-guarded memory accesses performed and the number of non-tag-guarded memory accesses performed, and the ratio of these numbers can then influence a determination of whether to guard tag check for a next memory access in order to steer the ratio towards a desired value.

At least some embodiments provide a method comprising:

performing a tag-guarded memory access in response to a target address, the tag-guarded memory access comprising a guard-tag check of comparing an address tag associated with the target address with a guard tag stored in association with a block of one or more memory locations comprising an addressed location identified by the target address; and in response to a sequence of received target addresses specifying a sequence of addressed locations, performing a non-tag-guarded memory access that does not perform the guard-tag check to a subset of the sequence of addressed locations.

At least some embodiments provide a computer program for controlling a host data processing apparatus to provide an instruction execution environment for execution of instructions of target program code, comprising:

memory access program logic to perform a tag-guarded memory access in response to a target address, the tag-guarded memory access comprising a guard-tag check of comparing an address tag associated with the target address with a guard tag stored in association with a block of one or more memory locations comprising an addressed location identified by the target address, wherein the memory access program logic, in response to a sequence of received target addresses specifying a sequence of addressed locations, performs a non-tag-guarded memory access that does not perform the guard-tag check to a subset of the sequence of addressed locations.

A storage medium may store the computer program described above. The storage medium may be a non-transitory storage medium.

Some particular embodiments are now described with reference to the figures.

Figure 1:
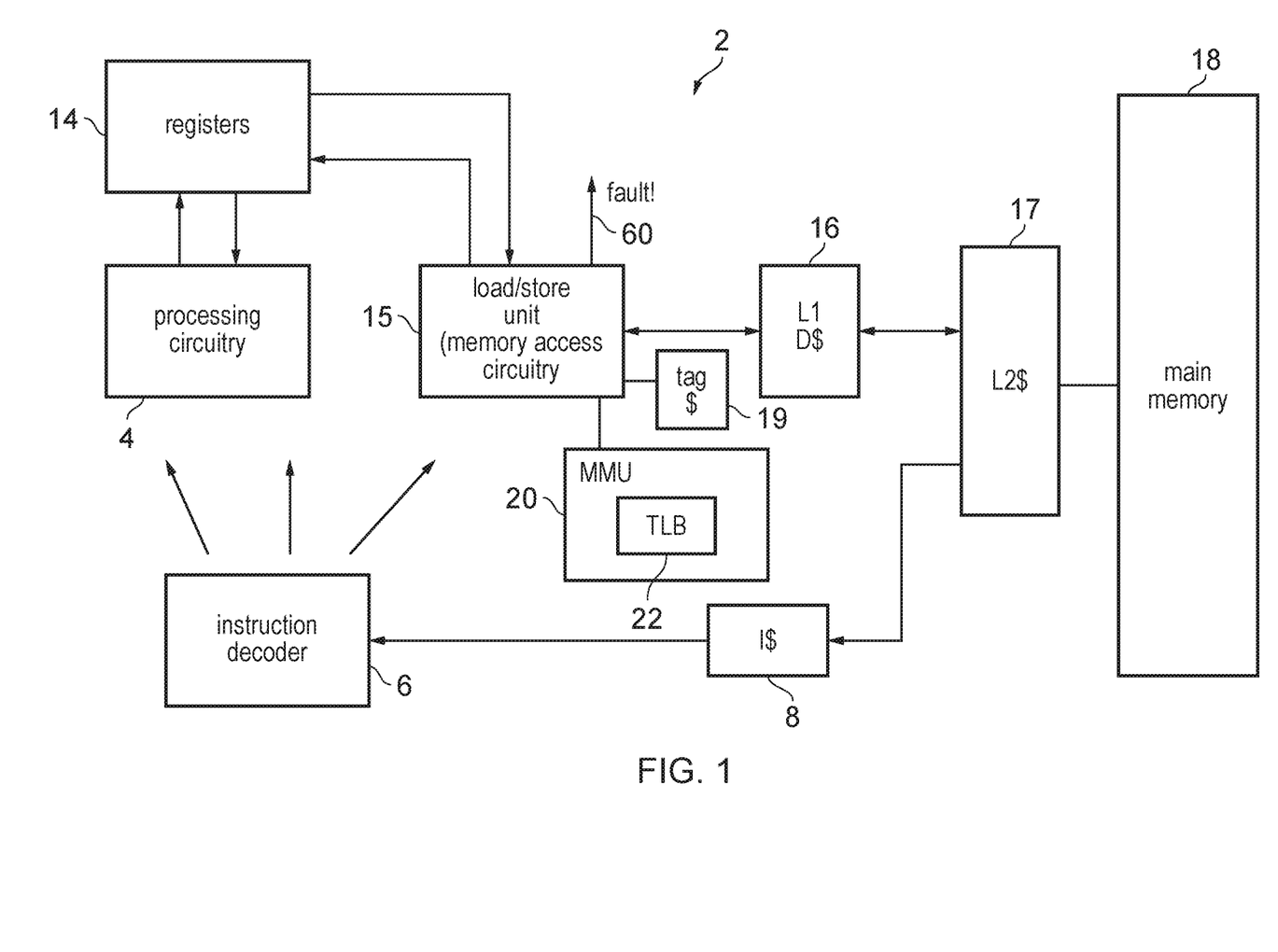
FIG. 1 schematically illustrates an example of a data processing apparatus.

FIG. 1 schematically illustrates an example of a data processing apparatus 2. It will be appreciated that this is simply a high level representation of a subset of components of the apparatus and the apparatus may include many other components not illustrated. The apparatus 2 comprises processing circuitry 4 for performing data processing in response to instructions decoded by an instruction decoder 6. The instruction decoder 6 decodes instructions fetched from an instruction cache 8 to generate control signals 10 for controlling the processing circuitry 4 to perform corresponding processing operations represented by the instructions. The processing circuitry 4 may include one or more execution units for performing operations on values stored in registers 14 to generate result values to be written back to the registers. For example the execution units could include an arithmetic/logic unit (ALU) for executing arithmetic operations or logical operations, a floating-point unit for executing operations using floating-point operands and/or a vector processing unit for performing vector operations on operands including multiple independent data elements. The processing circuitry also includes memory access circuitry (e.g. including a load/store unit) 15 for controlling transfer of data between the registers 14 and the memory system. In this example, the memory system includes the instruction cache 8, a level 1 (L1) data cache 16, a level 2 (L2) cache 17 shared between data and instructions, and main memory 18. It will be appreciated that other cache hierarchies are also possible—this is just one example. A memory management unit (MMU) 20 is provided for providing address translation functionality to support memory accesses triggered by the load/store unit 15. The MMU has a translation lookaside buffer (TLB) 22 for caching a subset of entries from page tables stored in the memory system 16, 17, 18. Each page table entry may provide an address translation mapping for a corresponding page of addresses and may also specify access control parameters, such as access permissions specifying whether the page is a read only region or is both readable and writable, or access permissions specifying which privilege levels can access the page. Further, as discussed in more detail below, a page table entry can specify tag-guard control information which is used by the present technique to control whether guard tag checking happens when access is made to an address within that page of addresses.

Figure 2:
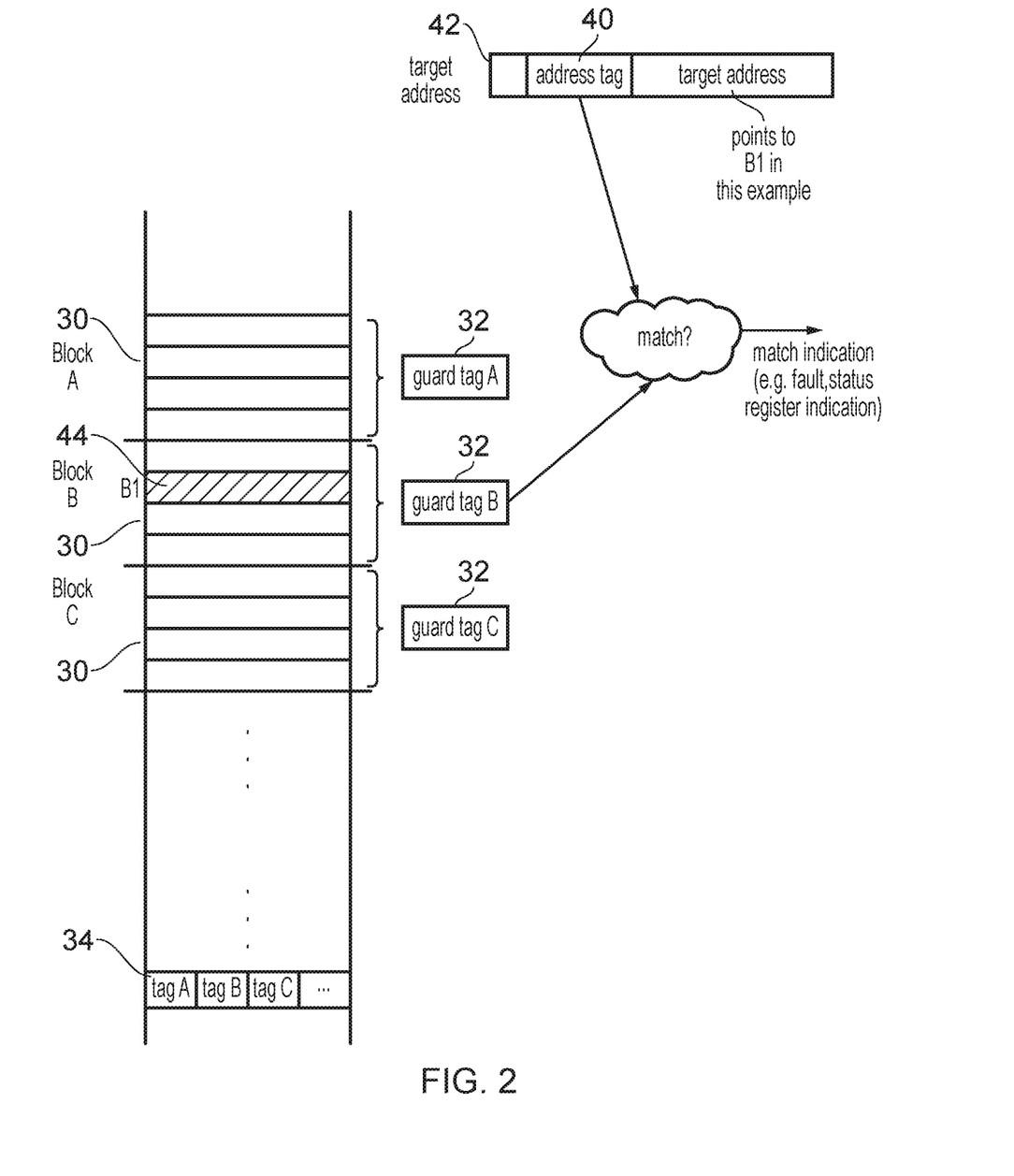
FIG. 2 shows an example of a tag-guarded memory access operation comprising checking whether an address tag matches a guard tag.

FIG. 2 schematically illustrates a concept of tag-guarded memory accesses. The physical address space used to refer to memory locations within the memory system may be logically partitioned into a number of blocks 30 each comprising a certain number of addressable locations. For conciseness, in the example of FIG. 2, each block 30 comprises four memory locations, but other block sizes could be used as well. Each block 30 is associated with a corresponding guard tag 32. The guard tags associated with a certain number of blocks 30 can be gathered together and stored either within a different architecturally accessible memory location 34 within the physical address space, or within additional storage locations provided in main memory 18, which are not architecturally accessible (not mapped to the same physical address space). The use of separate non-architecturally accessible storage may in some cases be preferred to avoid using up space in the data caches 16, 17 for caching guard tag values, which could impact on the performance of the regular code and could make coherency management more complex. An additional tag cache 19 could be provided in the micro-architecture for caching tag values from the non-architecturally accessible storage, for faster access than if the tags had to be accessed from main memory 18. The particular mapping of which tag storage locations 34 correspond to each block 30 may be controlled by the load/store unit 15 and could be hardwired or could be programmable. While in FIG. 2 each tag 32 is associated with a block of physical addresses, it would also be possible to provide guard tags 32 associated with virtual memory locations in a virtual memory address space, but this may require some additional address translations on each memory access. Hence by associating the guard tag 32 with physical memory locations this can improve performance. In general it is a choice for the particular micro-architectural implementation exactly how the guard tags 32 are associated with the corresponding blocks 30 of the physical address space. In general, all that is required is that the guard tag 32 associated with a given block of memory can be accessed and compared.

Hence, when a tag-guarded memory access is required to happen, an address tag 40 (which is associated with the target address 42 identifying the addressed location 44 to be accessed), can be compared against the guard tag 32 which is associated with the block of memory locations 30 which includes the addressed location 44. For example, in FIG. 2 the target address 42 points to a certain location B1 in memory, marked 44 in the address space of FIG. 2. Therefore the guard tag B which is associated with the block of locations B including location B1 is compared against the address tag 40 associated with a target address 42. As shown in the top of FIG. 2, the address tag 4 may be determined as a function of selected bits of the target address itself. In particular, the address tag may be determined from bits within a portion of the target address which is unused for indicating the specific memory location which is to be selected as the addressed location 44. For example, in some architectures the top portion of bits of the target address may always have a certain fixed value such as a sign extension (all 0s or all 1s) and so an address can be tagged with the address tag 40 by overwriting these unused bits with an arbitrary tag value. The particular address tag value can be selected by a programmer or compiler, for example. The address tag and guard tag 32 can be a relatively small number of bits, e.g. 4 bits, and so need not occupy much space within the memory and within the target address. Providing 4 bits of tag space, i.e. 16 possible values of the tags, can often be enough to detect many common types of memory access errors.

Hence, when a tag-guarded memory access is performed, a comparison is made between the address tag 40 and the guard tag 32 associated with a block 30 including the addressed location 44, and a determination as to whether they match. It should be noted that in the example configuration of FIG. 1 the comparison could be performed anywhere between the load/store unit 15 and the physical memory 18 (and indeed could be distributed along that path). However in this example, the comparison is described for simplicity in terms of it being carried out by the load/store unit 15. The load/store unit 15 generates a match indication indicating whether the address tag 40 and the guard tag 32 matched. For example, this match indication could be a fault signal 60, which is generated if there is a mismatch between the address tag 40 and the guard tag 32, or an indication placed in a status register indicating whether there was a match, or an entry added to an error report to indicate the address for which the error was detected and/or the instruction address of the instruction which triggered the error.

Figure 3:
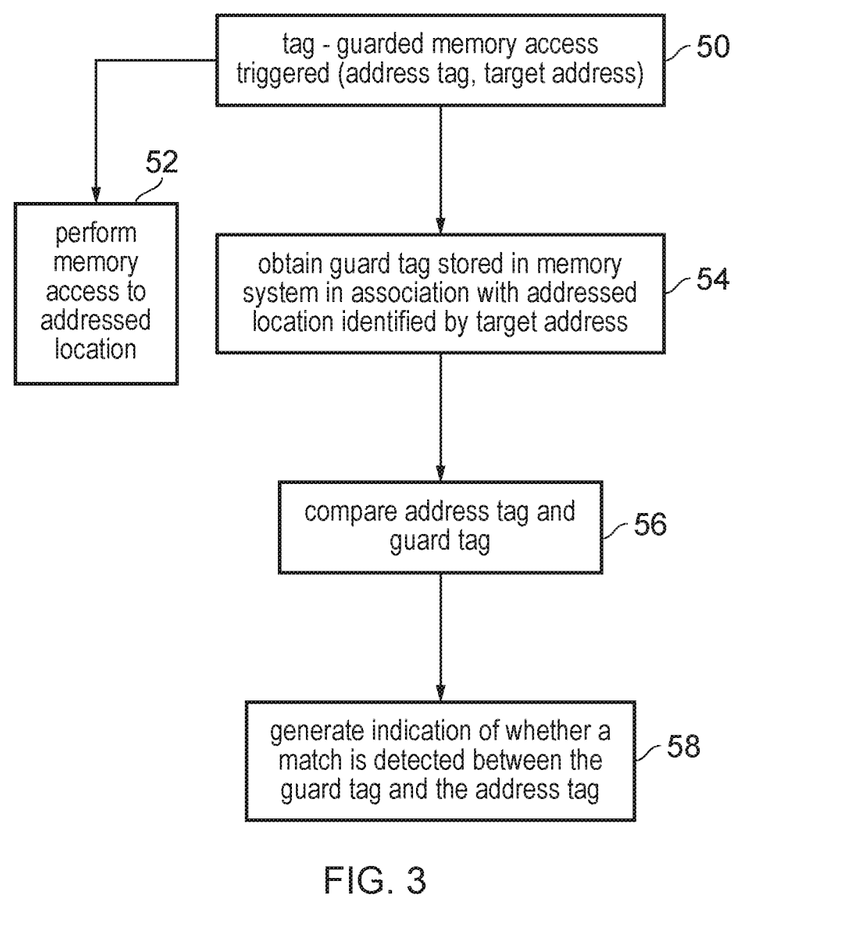
FIG. 3 is a flow diagram showing a method of performing a tag-guarded memory access operation.

FIG. 3 shows a flow diagram for handling a tag guarded memory access. The instruction triggering the memory access may specify an address tag and a target address. As shown in FIG. 2, in some cases the address tag may actually be derived from a subset of bits of the target address itself, although in other examples it could be specified in a separate register. At step 50, the instruction triggering the tag guarded memory accesses is encountered. In response, at step 52 the memory access circuitry 15 triggers a memory access to the addressed location 44 identified by the target address. Also, at step 54 the memory access circuitry 15 obtains the guard tag 32 which is stored in the memory system in association with the block of memory locations 30 that includes the addressed location 44 identified by the target address. At step 56 the memory access circuitry 15 compares the address tag 40 with the guard tag 32 obtained at step 54. At step 58 an indication of whether a match is detected between the guard tag and the address tag is generated by the memory access circuitry 15 (e.g. any of the types of match/mismatch reporting indication described above). The precise indication used to report any mismatch may vary from implementation to implementation.

Figure 4:
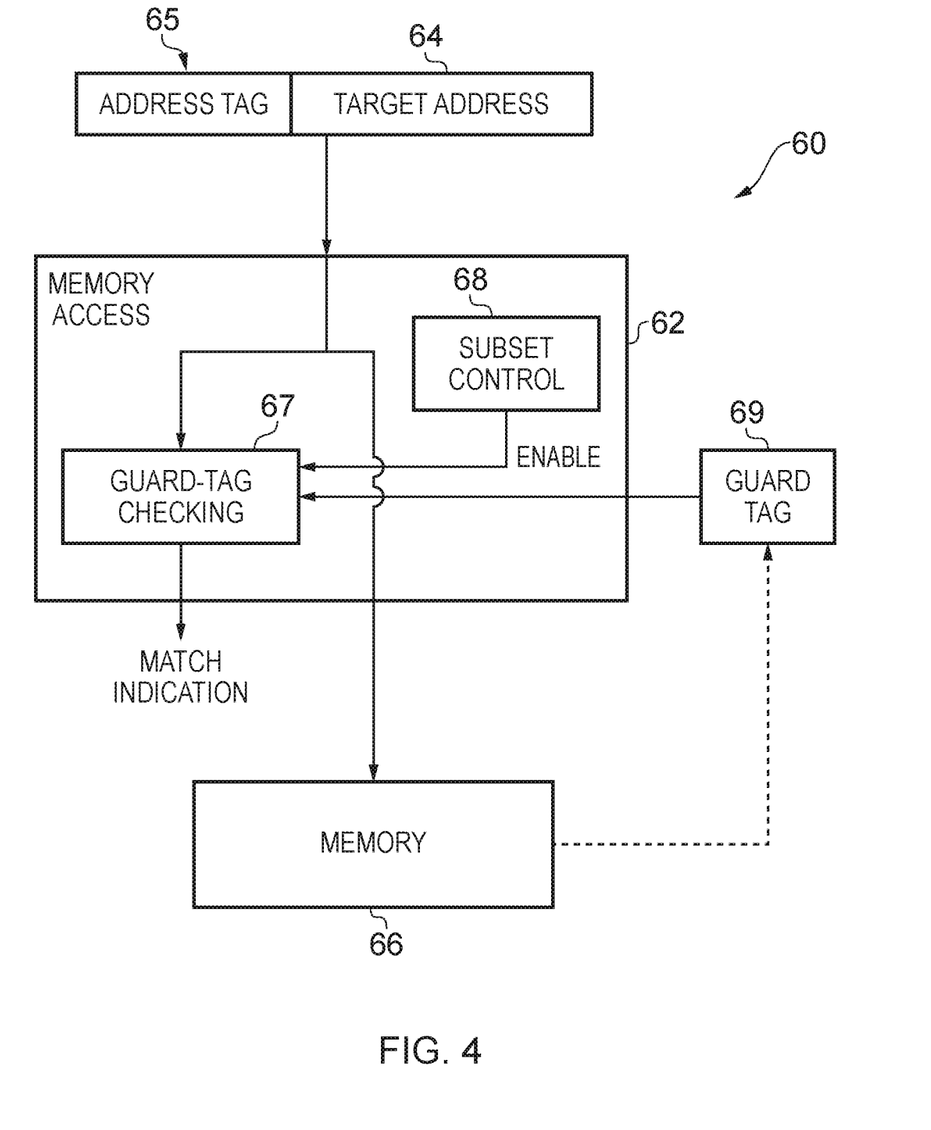
FIG. 4 schematically memory access circuitry in an example system.

FIG. 4 schematically illustrates a representation of an apparatus 60 in one example. Memory access circuitry 62, receives a target address (comprising an address tag portion 65). The memory access circuitry 62 uses the target address 64 to perform the required memory access with respect to memory 66 in a normal manner. However the memory access circuitry 62 also comprises guard-tag checking circuitry 67 and subset control circuitry 68, and the subset control circuitry 68 controls the activation of the guard-tag checking circuitry 67 (using an enable signal) so that the guard-tag checking is not carried out for a subset of the target addresses received. When the guard-tag checking is carried out the guard-tag checking circuitry 67 determines if the address tag 65 and the retrieved guard tag 69 match in the manner described above. A match indication is generated to indicate if they match or not.

Figure 5:
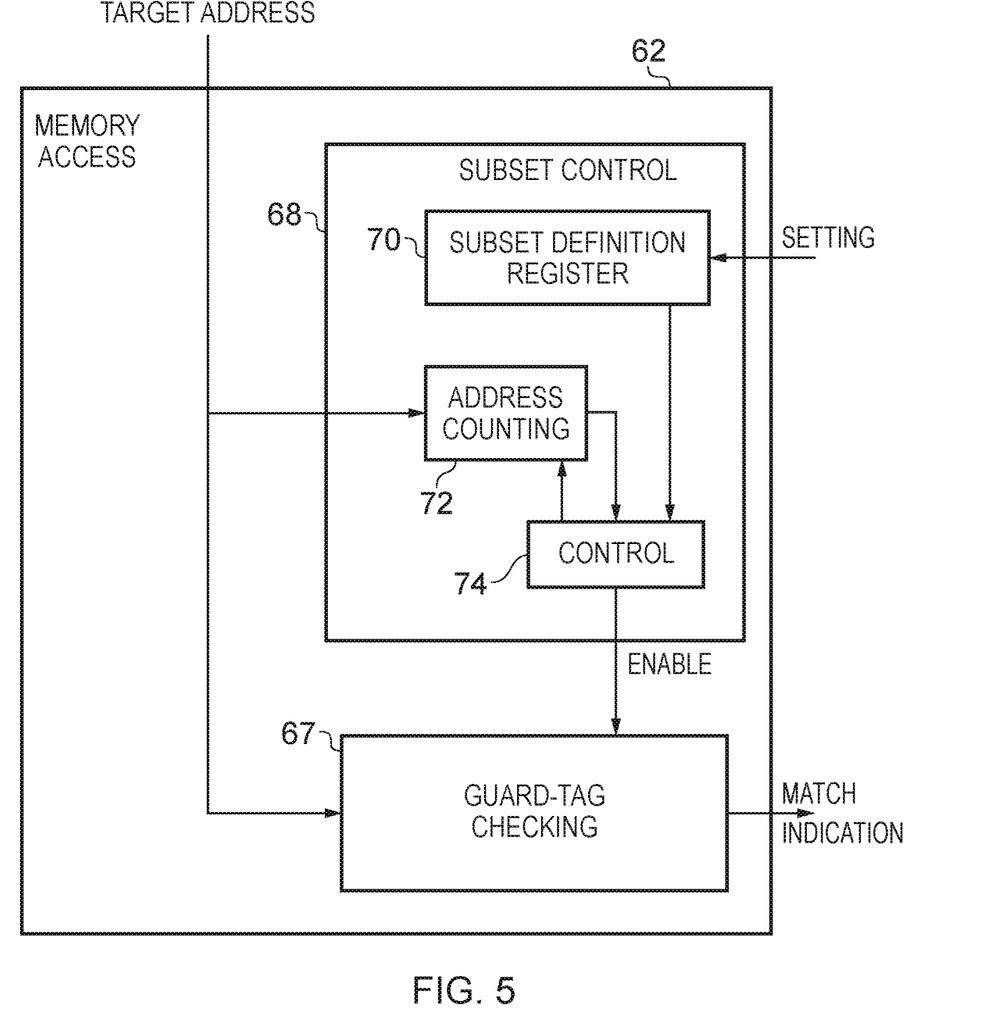
FIG. 5 schematically in more detail memory access circuitry in an example system.

FIG. 5 schematically illustrates in more detail some components of the memory access circuitry 62 of apparatus 60 in one example. The memory access circuitry 62 comprises subset definition register 70, address counting circuitry 72, and control circuitry 74. The content of the subset definition register 70 may be set in order to define the subset of the target addresses received for which the guard-tag checking is not carried out. This may for example specify a fraction, so that the defined fraction of memory accesses (counted using the address counting circuitry 72), are therefore carried out without the guard tag checking. It may alternatively define an integer n, so that the memory access circuitry performs the non-tag-guarded memory access for every 1/n memory access (counting the accesses in the address counting circuitry 72). The memory access circuitry can be arranged to gather a statistical view of the number of tag-guarded memory accesses performed and the number of non-tag-guarded memory accesses performed (see the address counting circuitry 72), and the ratio of these numbers can then influence a determination of whether to guard tag check for a next memory access in order to steer the ratio towards a desired value. Hence the control circuitry 74 makes access to the subset definition register 70 and the address counting circuitry 72 to support its determination of whether, for a given target address, guard tag checking is to be carried out which it signals to the guard-tag checking circuitry 67 using an enable signal.

Example processes which the control circuitry 74 may follow in order to determine whether, for a given target address, guard tag checking is to be carried out are now discussed with reference to the flow diagrams of FIGS. 6 and 7.

Figure 6:
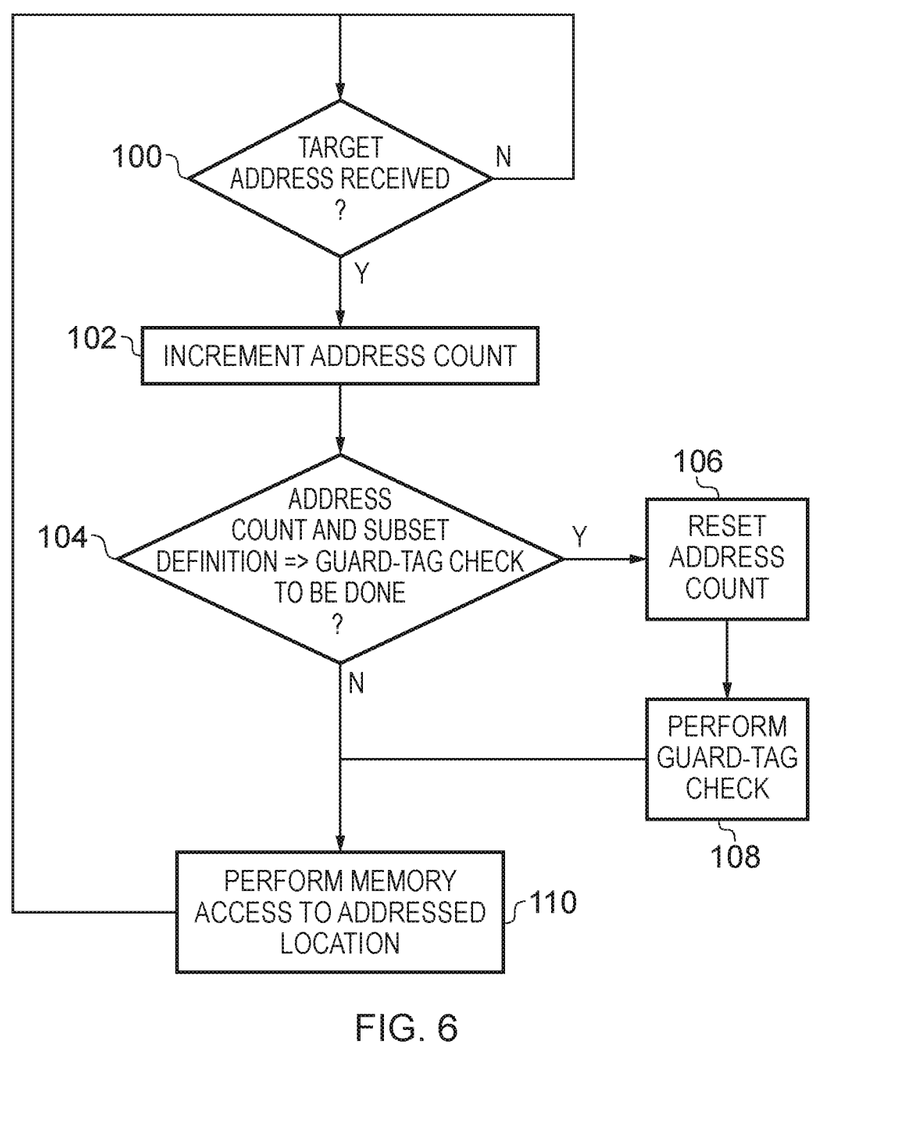
FIG. 6 is a flow diagram showing how guard-tag checking is applied to a subset of memory accesses in one example.

In FIG. 6 the flow starts at step 100, where the process waits until a target address is received. When it is, at step 102, an address count is incremented. It is then determined at step 104 if the current address count and the subset definition mean that guard tag checking is to be carried out. When it should the flow proceeds to step 106, where the address count is reset, and at step 108 the guard tag checking is performed. Step 110 then follows where the memory access is carried out. If however it is determined at step 104 that the current address count and the subset definition mean that guard tag checking should not be carried out, then the flow proceeds directly to step 110. It should be noted that this described flow is not be interpreted as meaning that the guard tag checking must be performed before the memory access. They may be performed in any respective order. Indeed in some examples the outcome of the guard tag checking could be used to determine if the memory access is allowed to proceed. Finally the flow returns to step 100 to await the next target address.

Figure 7:
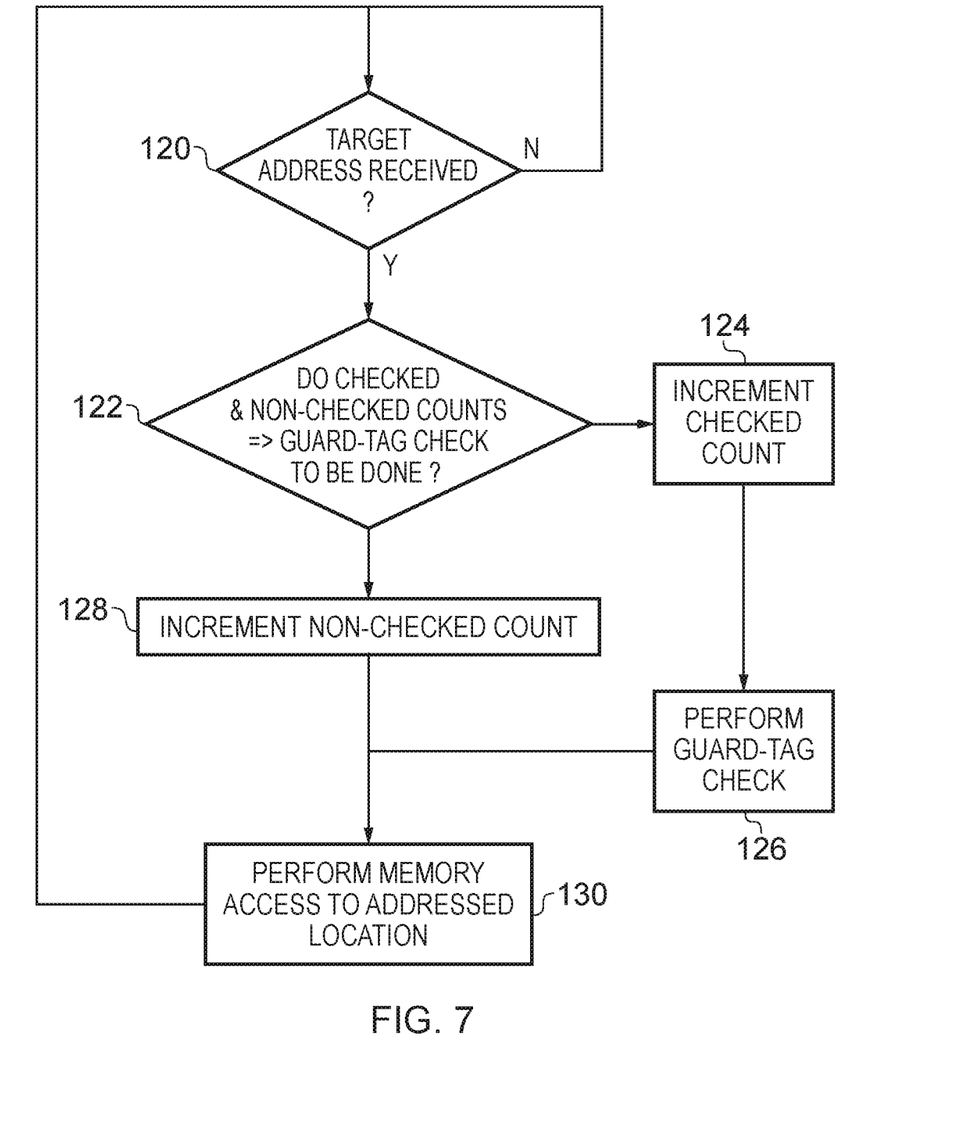
FIG. 7 is a flow diagram showing how guard-tag checking is applied to a subset of memory accesses in one example.

In FIG. 7 the flow starts at step 120, where the process waits until a target address is received. When it is, at step 122, it is determined if counts of guard tag checked accesses and non-guard tag checked accesses (and the subset definition) mean that guard tag checking is to be carried out. When it should the flow proceeds to step 124, where the count of guard tag checked accesses is incremented and at step 126 the guard tag checking is performed. Step 130 then follows where the memory access is carried out. If however it is determined at step 122 that counts of guard tag checked accesses and non-guard tag checked accesses (and the subset definition) mean that guard tag checking should not be carried out, then the flow proceeds to step 128, where the count of non-guard tag checked accesses is incremented. Step 130 then follows where the memory access is carried out. Finally the flow returns to step 120 to await the next target address.

Figure 8:
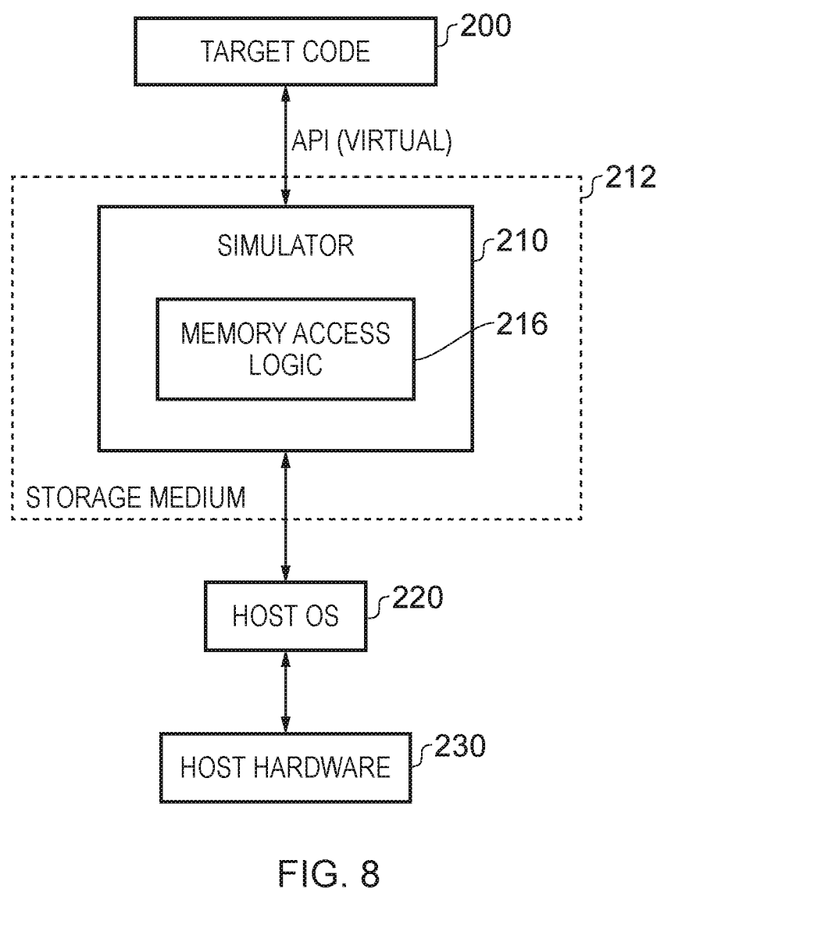
FIG. 8 shows an example of a simulator supporting address translation logic.

FIG. 8 illustrates a simulator implementation that may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 230, optionally running a host operating system 220, supporting the simulator program 210. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 230), some simulated embodiments may make use of the host hardware, where suitable.

The simulator program 210 may be stored on a computer-readable storage medium 212 (which may be a non-transitory medium), and provides a program interface (instruction execution environment) to the target code 200 (which may include applications, operating systems and a hypervisor) which is the same as the application program interface of the hardware architecture being modelled by the simulator program 210. Thus, the program instructions of the target code 200 may be executed from within the instruction execution environment using the simulator program 210, so that a host computer 230 which does not actually have the hardware features of the apparatus 60 discussed above, and in particular the memory access circuitry 62, can emulate these features. For example, the simulator program 210 may include memory access logic 216 for accessing addressed locations and for carrying out guard tag checking. Thus the simulator program 210 may also include memory access program logic 216 for determining the above discussed subset and controlling whether to perform the comparison of a guard tag and an address tag and reporting whether any mismatch between the guard tag and the address tag has been detected.

In brief overall summary, an apparatus is provided which comprises memory access circuitry to perform a tag-guarded memory access in response to a target address, the tag-guarded memory access comprising a guard-tag check of comparing an address tag associated with the target address with a guard tag stored in association with a block of one or more memory locations comprising an addressed location identified by the target address. The memory access circuitry is responsive to a sequence of received target addresses specifying a sequence of addressed locations to perform a non-tag-guarded memory access that does not perform the guard-tag check to a subset of the sequence of addressed locations.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

The invention claimed is:
1. Apparatus comprising:
  memory access circuitry to perform a tag-guarded memory access in response to a target address, the tag-guarded memory access comprising a guard-tag check of comparing an address tag associated with the target address with a guard tag stored in association with a block of one or more memory locations comprising an addressed location identified by the target address,
wherein:
the memory access circuitry is responsive to a sequence of received target addresses specifying a sequence of addressed locations to perform a non-tag-guarded memory access that does not perform the guard-tag check to a subset of the sequence of addressed locations; and
the memory access circuitry comprises address counting circuitry to maintain a current address count indicative of a number of received target addresses, and the memory access circuitry is configured to determine whether to perform the non-tag-guarded access or the tag-guarded access based on the current address count.

2. The apparatus as claimed in claim 1, comprising subset configuration data storage, wherein the subset is defined by subset configuration data stored in the subset configuration data storage.

3. The apparatus as claimed in claim 2, wherein the subset configuration data storage is a configuration register.

4. The apparatus as claimed in claim 2, wherein the subset configuration data defines a fraction, wherein the memory access circuitry is responsive to the subset configuration data to selectively perform the non-tag-guarded memory access such that the subset of the sequence of addressed locations corresponds to the fraction.

5. The apparatus as claimed in claim 2, wherein the subset configuration data defines an integer value, wherein the memory access circuitry is responsive to the subset configuration data to perform the non-tag-guarded memory access for addressed locations which correspond to ordinal multiples of the integer value in the sequence of addressed locations.

6. The apparatus as claimed in claim 2, wherein the subset configuration data defines a target value, wherein the memory access circuitry is responsive to the subset configuration data to perform the non-tag-guarded memory access, such that the subset of the sequence of addressed locations statistically corresponds to the target value over a predetermined time period.

7. A method comprising:
performing a tag-guarded memory access in response to a target address, the tag-guarded memory access comprising a guard-tag check of comparing an address tag associated with the target address with a guard tag stored in association with a block of one or more memory locations comprising an addressed location identified by the target address;
in response to a sequence of received target addresses specifying a sequence of addressed locations, performing a non-tag-guarded memory access that does not perform the guard-tag check to a subset of the sequence of addressed locations;
maintaining a current address count indicative of a number of received target addresses; and
determining whether to perform the non-tag-guarded access or the tag-guarded access based on the current address count.

8. A non-transitory storage medium storing a computer program for controlling a host data processing apparatus to provide an instruction execution environment for execution of instructions of target program code, comprising:
memory access program logic to perform a tag-guarded memory access in response to a target address, the tag-guarded memory access comprising a guard-tag check of comparing an address tag associated with the target address with a guard tag stored in association with a block of one or more memory locations comprising an addressed location identified by the target address,
wherein:
the memory access program logic, in response to a sequence of received target addresses specifying a sequence of addressed locations, performs a non-tag-guarded memory access that does not perform the guard-tag check to a subset of the sequence of addressed locations; and
the memory access program logic comprises address counting program logic to maintain a current address count indicative of a number of received target addresses, and the memory access program logic is configured to determine whether to perform the non-tag-guarded access or the tag-guarded access based on the current address count.

* * * * *